United States Patent [19]

Hoyeck

[11] Patent Number: 4,838,792

[45] Date of Patent: Jun. 13, 1989

[54] ONE LETTER ALPHABET (OLA)

[76] Inventor: Ralph H. Hoyeck, 80 Somerville, Westmount, Quebec, Canada, H3Z 1J5

[21] Appl. No.: 35,885

[22] Filed: Apr. 8, 1987

[51] Int. Cl.⁴ ........................ G09B 11/04; G09F 13/00

[52] U.S. Cl. ........................................ 434/163; 40/451; 434/164

[58] Field of Search ............... 434/159, 160, 161, 162, 434/163, 164, 83, 216; 40/450, 451, 452, 447

[56] References Cited

U.S. PATENT DOCUMENTS

| | | | |
|---|---|---|---|
| 1,688,266 | 10/1928 | Coffey | 40/452 |
| 3,731,402 | 5/1973 | Paul | 434/164 |
| 3,733,468 | 5/1973 | Eberly, Jr. | 434/164 |
| 3,905,133 | 9/1975 | Charman | 434/83 |
| 4,012,010 | 3/1977 | Friedman | 434/83 X |

FOREIGN PATENT DOCUMENTS

| | | | |
|---|---|---|---|
| 546200 | 3/1932 | Fed. Rep. of Germany | 434/163 |
| 793864 | 12/1935 | France | 434/159 |
| 694042 | 7/1953 | United Kingdom | 434/160 |

*Primary Examiner*—William H. Grieb

[57] ABSTRACT

The present invention deals with guided writing and variable displays, for signs, illustrations, etc., using: (a) guiding points at the main intersections of the lines of a common symbol representing a group of symbols, letters or figures, etc., and display means in between; (b) holding means at the said guiding points and tie lines in between; (c) grooves, raised tracks, magnetic tracks, stretched strings, etc., in between the said guiding points and fillers, coverings, markings, etc., along the lines of the symbols to be displayed; (d) colorless markings or grooves as in (c) and pen markings over the selected symbols; (e) bars, inking elements, etc., in between said guiding points, connected to various command centers to print or display the required symbols; (f) series of lights on electric wires in between said guiding points, activated by various command centers; (g) light sources located at the guiding points described in (a) and projecting lights in between, along the lines of the characters to be displayed.

19 Claims, 20 Drawing Sheets

ONE LETTER ALPHABET (OLA)

The present invention is called One Letter Alphabet and the like, and is abbreviated as O.L.A.

CROSS REFERENCES TO RELATED APPLICATIONS

The search carried out in Canada and the U.S. patent offices did not reveal any substantial patents that could replace the present one.

1. Field of the invention

The present invention deals with a common symbol for writing, signs and displays, etc., used to represent a group of symbols where each symbol of the said group be represented on the said common symbol. The said common symbol is represented in a variety of forms including:

A - Guiding points at the main intersections, of the common symbol and display means in between.

B - Guiding lines along the directions of the common symbol and colored markings along the lines of the selected character to be displayed.

C - Continuous guiding grooves, raised tracks, magnetic tracks, stretched strings or the like along the lines of the common symbol and fillers, coverings, marking, etc., along the lines of the selected character to be displayed.

D - Sections of bars, inking elements, burning, lighting, magnetic elements or the like in between the guiding points described in (A), which elements are connected in different combinations to various command centers whose activation prints or displays the required letter of figure.

E - Sections of electric wires joining a succession of lights and spread in between the guiding points along the lines of the common symbol, which sections of electric wires are connected in various combinations to different command centers to light and display the selected character.

F - Light sources located at the guiding points described in (A) and projecting their lights along the lines of the common symbol, which light sources are connected in various combinations to different command centers, whose activation creates the beaming lights along the lines of the required character to display said character.

G - With the use of central flashing lights reflecting on various reflectors mounted at the intersections of the main lines forming the common symbol.

2. Prior Art

The prior art used common symbols represented by multi-colored plates mounted on pivoting shafts, operated by mechanical pneumatic, electric systems of the like a fact which requires large numbers of accessories and costly mechanisms limiting its use.

At the same time, the prior art uses electric and electronic diodes, systems limited in their use and applicable only to small scale displays.

SUMMARY

The present invention deals with a common symbol representing a group of symbols where each of the said symbols could be represented individually on the said common symbol by using: colored ink, fillers, ties, beaming lights, heating, magnetic or light elements, along the lines of the symbol to be displayed and in other cases by using magnetized blocks along the tracks of the symbol to be displayed, and moreover by using unilevel and multilevel, various size common symbols made of individual bars or elements grouped in different combinations to type or print the required symbol, letter or figure of a selected size with one single command.

BRIEF DESCRIPTION OF THE DRAWINGS

FIG. 21 shows the same pattern shown in FIG. 14 using sections of bars or elements joining the locations of the holding means. Said bars or elements are activated independently in different combinations for printing, typing, display purposes or the like.

FIG. 24 shows a common alpha-numeric symbol displayed by light sources mounted at the main intersections of the main lines of said common symbol and beaming lights in between.

DESCRIPTION OF THE PREFERRED EMBODIMENTS

Figure 1:
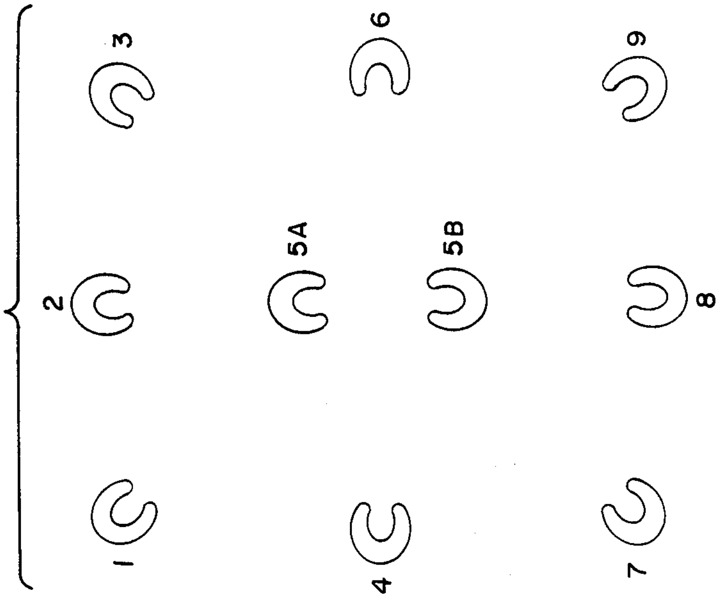
FIG. 1 shows a typical 10 openings in a horseshoe shape, on a flat surface, providing holding means aligned along 3 vertical lines beginning and ending at equal levels.

The present invention deals with guided writing and interchangeable signs, displays and illustrations, using a common symbol representing a group of symbols, electrical, musical, alpha-numeric or the like, where each individual symbol of the group could be represented and displayed separately on the said common symbol, generally as shown on the drawings and subsequently described hereinafter:

See FIG. 1

FIG. 1 shows 9 fixed holding means distributed at 9 points forming 3 parellel lines, considered as the 3 horizontal lines; 1.2.3, 4.5.6, 7.8.9, or 3 vertical lines; 1.4.7, 2.5.8, 3.6.9.

All the characters of the alpha-numeric could be displayed separately by means of continuous flexible ties connecting a different set of the 9 aforementioned holding means.

For a better display the tie connecting the different holders should be of a visible color in contrast with the surface behind it.

This system could be applicable for mini signs, illustrations and displays, as well as for very large ones that could not be realized with the prior art.

The mini displays could be distinguished visually as well as with a toughing process.

For practical reasons, in this case, the central holding mean No. 5 is split into two holding means, 5A and 5B to allow better connections to ties coming from different directions.

Figure 2:
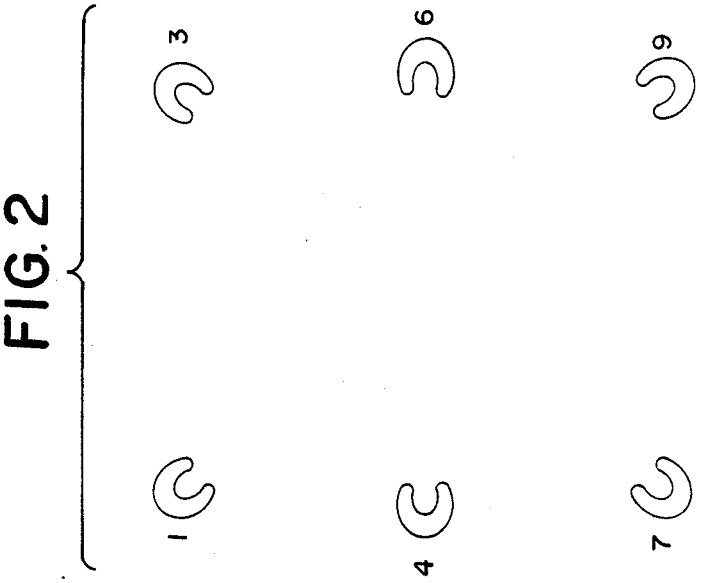
FIG. 2 is the same as FIG. 1 with its middle row of openings eliminated.

See FIG. 2

FIG. 2 is a simplification of FIG. 1, it shows only 6 holding means out of the 9 original holding means shown in FIG. 1, namely; 1.3, 4.6, 7.9. The 6 holding means are equally distributed along 2 vertical lines; 1.4.7 and 3.6.9.

The simplified FIG. 2 is a common symbol generally considered for the numbers 1 to 9. Anyone of the numbers could be represented individually by means of a flexible tie joining the required number of holding means in a required pattern to show the required number.

Figure 3:
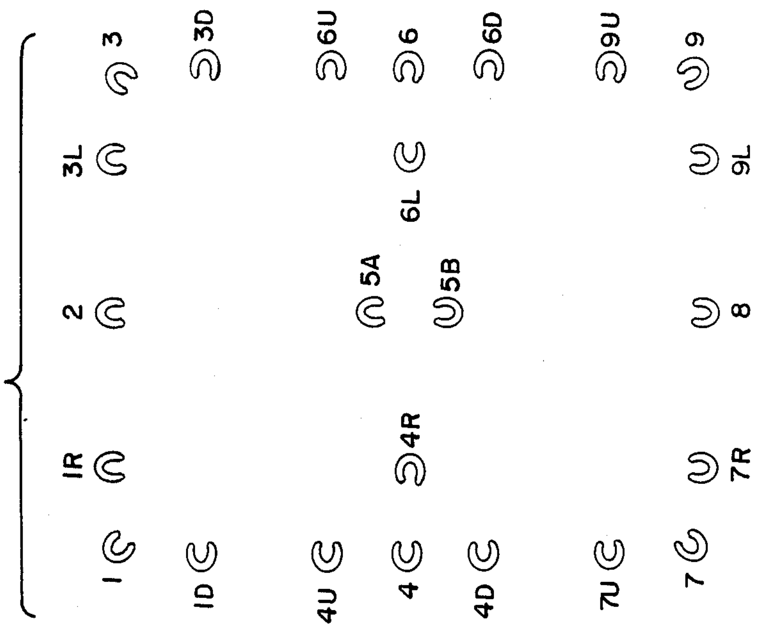
FIG. 3 is the same as FIG. 1 with 16 additional similar openings located around the original openings forming the outer lines of the figure.

See FIG. 3

FIG. 3 shows the same 9 basic holding means shown in FIG. 1 plus 14 additional secondary holding means distributed around the 6 outer holding means which are: 1R. 1D.,3L. 3D., 4U. 4R. 4D., 6U. 6L. 6D., 7U. 7R., 9U. 9L.

The 14 additional holding means allow the representation of the symbols in the same way as in FIG. 1 but with more contour details than would be possible with the 9 basic holding means shown in FIG. 1.

Figure 4:
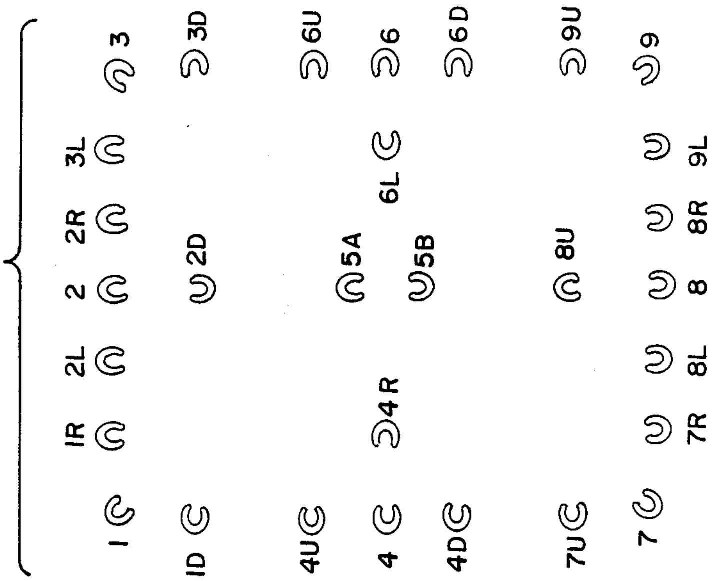
FIG. 4 is the same as FIG. 3 with additional similar openings located around the original upper and lower central openings.

See FIG. 4

FIG. 4 shows the same holding means shown in FIG. 3, plus 6 additional holding means, namely: 2L. 2R. 2D., and 8U. 8L. 8R.

The 6 additional holding means allow the additional representation of the lower case symbols of the alpha-numeric.

Figure 5:
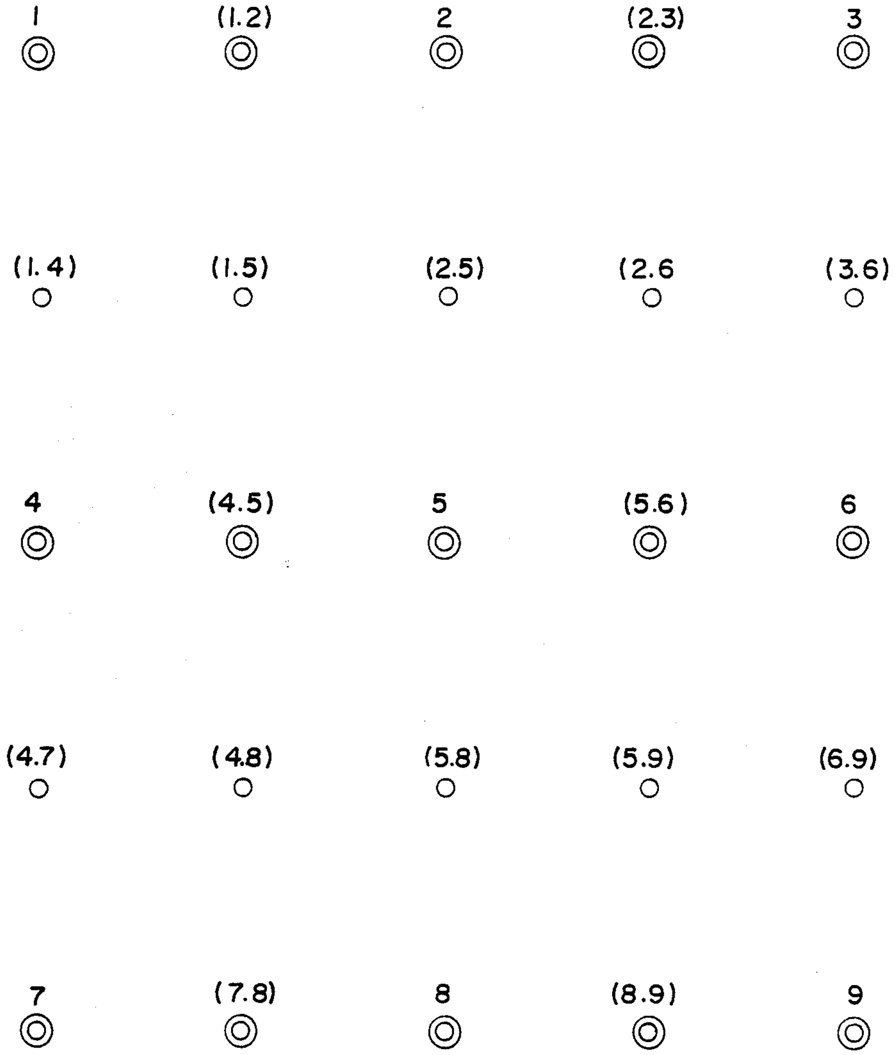
FIG. 5 shows 5 rows of raised multi-level holding means located along 5 parallel lines beginning and ending at equal levels.

See FIG. 5

FIG. 5 shows basically the same 9 holding means shown in FIG. 1.

In addition, FIG. 5 shows additional holding means superimposed within the 9 original holding means shown in FIG. 1.

The additional holding means, at points (1.2), (4.5), (7.8), combined with points 1.2, 4.5, 7.8, create at the left half of FIG. 5 another figure of 9 holding means, similar to FIG. 1, which serves by itself as a common symbol for a group of alpha-numeric characters, the same as is possible on FIG. 1 itself.

The same definition described in paragraph could be repeated for the right half of FIG. 5 involving the 9 holding means; 2. (2.3) 3, 5. (5.6). 6, 8. (8.9). 9.

The addition of holding means at (1.4), (1.5), (2.5), combined with those at 1. (1.2).2, 4. (4.5).5, create at the upper left quarter of FIG. 5, a complete figure of 9 holding means, similar to FIG. 1 itself and could be used to display any symbol displayed in FIG. 1.

Similar description could be applied to the upper right quarter of FIG. 5, the lower left quarter and the lower right quarter of FIG. 5 equally.

To avoid that the ties representing different symbols overlap, the holding means are made to space the different ties horizontally and vertically, so that they would not obscure each other. This is accomplished by having multi-level holders with wide pulley like circles at the bottom and smaller ones above (see FIG. 18*a*).

Figure 6:
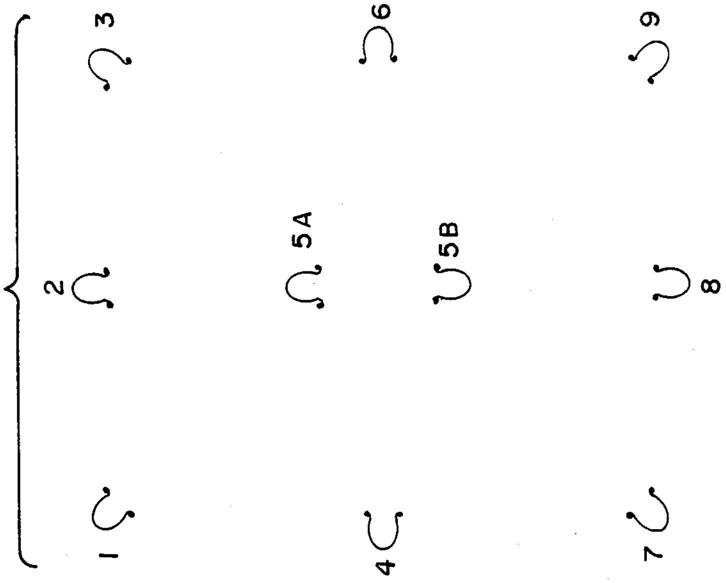
FIG. 6 is similar to FIG. 1 except that the horseshoe openings are reduced to a simple C cut in the flat surface.

See FIG. 6

FIG. 6 is the same as FIG. 1 to 4, with the difference that the holding means, shown in FIG. 1 to 4, in a horseshoe shape, or the like, are reduced to simple curvilinear C shape cut lines raised over the surface.

At the same time the patterns used in FIGS. 1 to 6 could be used for writing by means of flexible ties knitted or woven in between the different holding means to display the required figure, letter or symbol.

Furthermore, the pages written by means of flexible ties could be used for printing by mounting raised flexible ties soaked with dry stamp carbon or the like and using the assembly as a stamp itself to print it on another surface.

Figure 7:
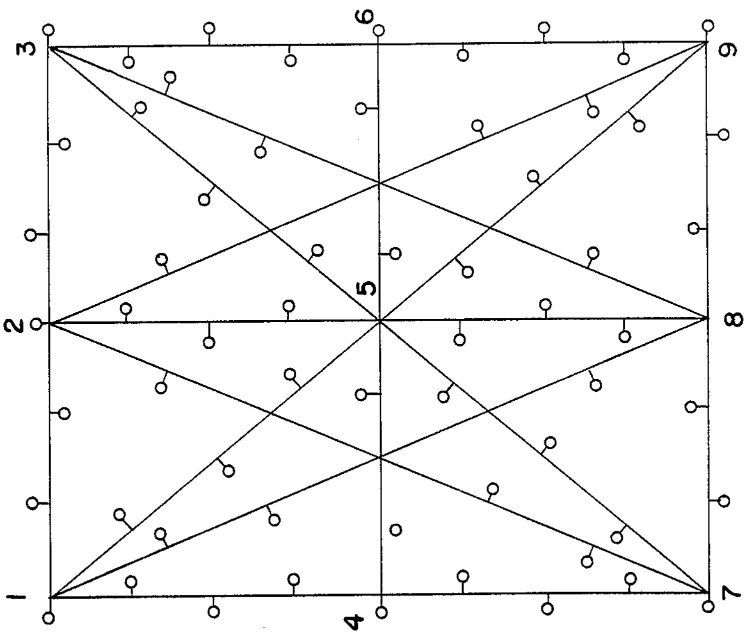
FIG. 7 is the same as FIGS. 1, 2, or 3 with additional ties provided with a succession of lights in between the different holding means.

See FIG. 7

FIG. 7 shows 9 or more holding means distributed in a similar way to those in FIGS. 1 to 4 and connected with ties, provided with a succession of lights, joining the following holding means: 1-2-3, 4-5-6, 7-8-9, 1-4-7, 2-5-8, 3-6-9, 1-5-9, 3-5-7, 1-8, 2-7, 2-9, 3-8 or the like.

Each set of sections of the lines joining the holding means are connected to an electric source in different combinations in a way that by switching on the current to one combination, any symbol of the alpha-numeric could be displayed separately by lighting the set of lines representing it.

The arrangement shown in FIG. 7 could be used for small and large displays, from one foot symbols, or less, to one hundred foot symbols or more.

Figure 8:
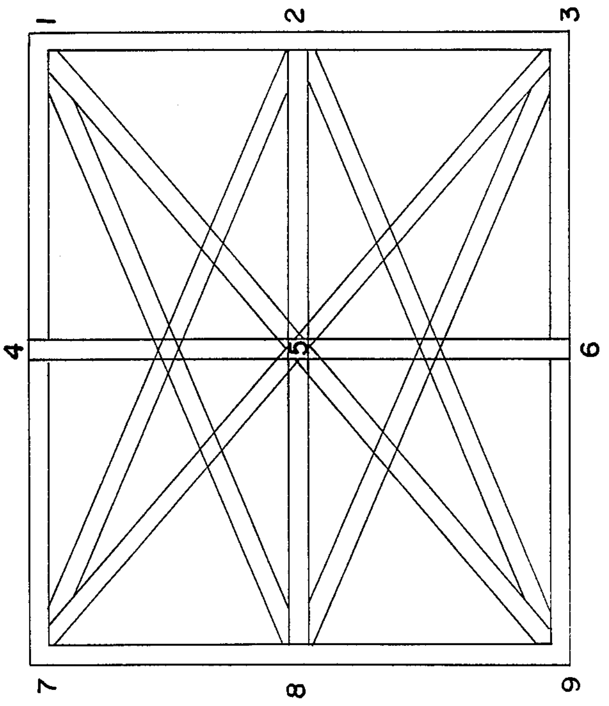
FIG. 8 shows continuous grooves, raised tracks, magnetic tracks or the like joining the locations of the holding means shown in FIG. 1.

See FIG. 8

FIG. 8 shows parallel lines representing continuous grooves, channels or the like, joining the locations of the original 9 holding means shown in FIG. 1. The continuous grooves are distributed in the following pattern:

A - 3 horizontal parellel grooves namely: 1-2-3, 4-5-6, 7-8-9.

B - Vertical parellel grooves namely: 1-4-7, 2-5-8, 3-6-9, perpendicular to the first 3 horizontal grooves.

C - 2 cross diagonal grooves namely: 1-5-9, 3-5-7.

D - 2 diagonals in the left half of the picture namely: 1-8, 2-7.

E - 2 diagonals in the right half of the picture namely: 2-9, 3-8.

7-8-2 - Any symbol of the alpha numeric could be displayed on FIG. 8 in one of the following manners:

A- By colouring the groove along the lines of the required symbol with a colour in contrast with the remaining colour of the surface containing FIG. 8. The advantage of this method is that it offers a guided writing resulting in a neat presentation of the required symbols which could be best used in headlines, labels, on addresses which fact makes it easier to the sensing devices to distinguish the said symbols.

B- By using a flexible tie, coloured in contrast with the surface on which it is displayed, to fill in the groove along the lines of the symbol to be displayed. To change the displayed symbol, the flexible tie is pulled out and replaced along different lines to display a different symbol.

The excess in the links of the tie is either double folded underneath each other, or passed through a hole in the groove to the back of the picture.

Symbols displayed in this manner could be distinguished visually as well as by touching process.

C- By using a coloured soft paste filler that would dry instantly after being spread out to fill the groove along the track of the symbol to be displayed. Such paste is washed out or brushed away and replaced to display another symbol.

D- By using a cylindrical continuous groove filled with bi-coloured cylindrical solid sections with opposite sides also distinguishable by touching process. To display the symbol required, a set of cylindrical sections are rotated to display all the same colour at the same time, thus revealing the required symbol. This method allows also to distinguish the displayed symbols visually as well as with touching process of the rotated cylinders.

E- By using a powdery filler filling the grooves all through. To display any symbol represented on the common symbol, the filler is scraped out of the groove along the lines of said symbol.

The patterns shown on FIGS. 8 to 14 could be either embossed, engraved, moulded, cast or the like on paper, plastic, metal, wood, etc., and they could be used for displaying symbols, for writing, for labels, addresses, letterheads, for name plates, for price tags, large signs on buildings, etc.

Figure 9:
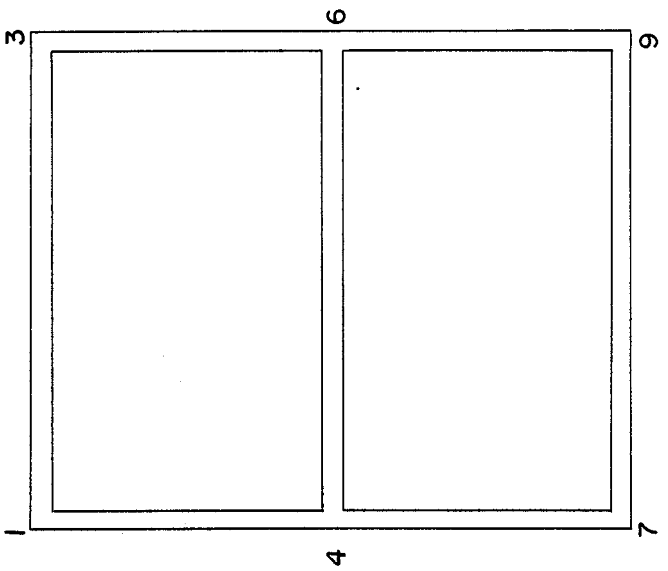
FIG. 9 shows a continuous groove joining the locations of the holding means shown in FIG. 2.

See FIG. 9

FIG. 9 shows a simplified picture of FIG. 8 reducing it simply to 2 rectangles standing up over each other resulting in a continuous groove in the following pattern:

A- 3 horizontal parallel grooves; 1-3, 4-6, 7-9.

B- 2 vertical grooves; 1-4-7, 3-6-9, perpendicular to, and bordering the 3 horizontal grooves forming together a straight Figure Eight.

The resulting FIG. 9 represents a common symbol for the ten arabic numbers where any of the numbers could be displayed separately on it.

Figure 10:
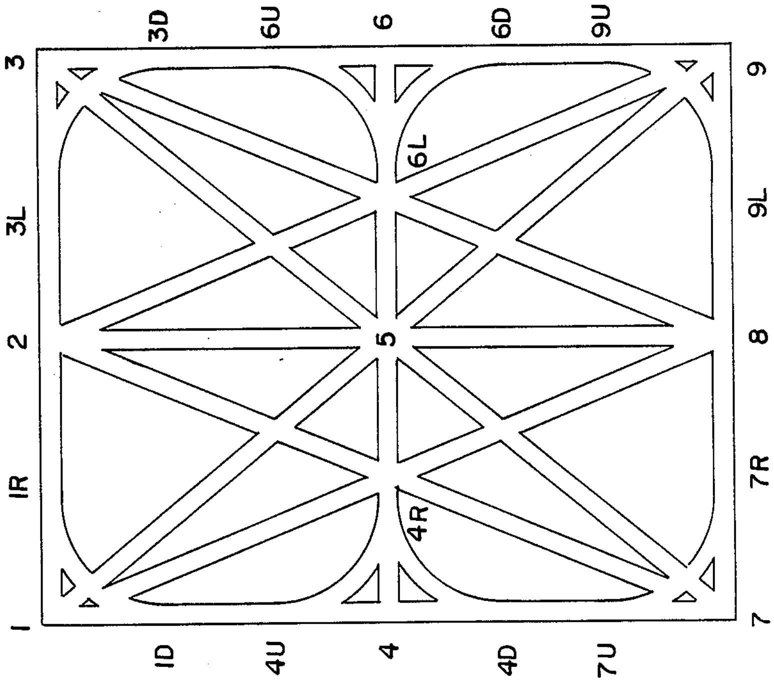
FIG. 10 shows a continuous groove joining the locations of the holding means shown in FIG. 3, with circular grooves joining the corner lines.

See FIG. 10

FIG. 10 shows the basic continuous grooves shown on FIG. 8 with additional concave, curvilinear grooves on the corners 1, 3, 7, 9 like 1R-1D, and double opposite grooves on the corners 4 and 6, like the grooves 4U-4R, etc.

FIG. 10 allows the representation of the alpha numeric symbols with more distinguishable contour lines than it would be possible with FIG. 8.

Figure 11:
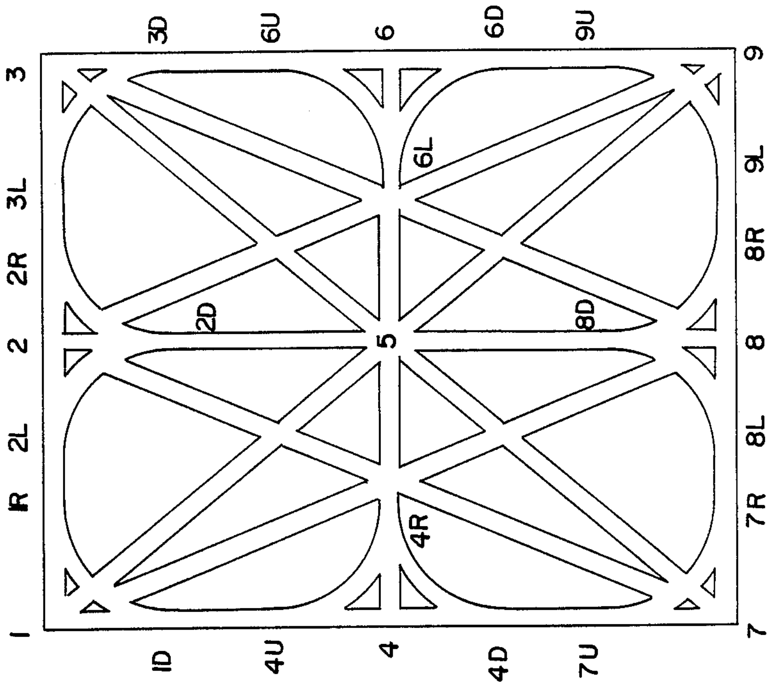
FIG. 11 shows a continuous groove joining the locations of the holding means shown in FIG. 4 with circular grooves joining the corner lines all around.

See FIG. 11

FIG. 11 shows the same continuous grooves shown in FIG. 10 with additional similar opposite curvilinear grooves on the corners 2 and 8, like 2L-2D, 2R-2D, etc. FIG. 11 allows the additional representation of the lower case alpha numeric symbols which was not possible on FIG. 10.

Figure 12:
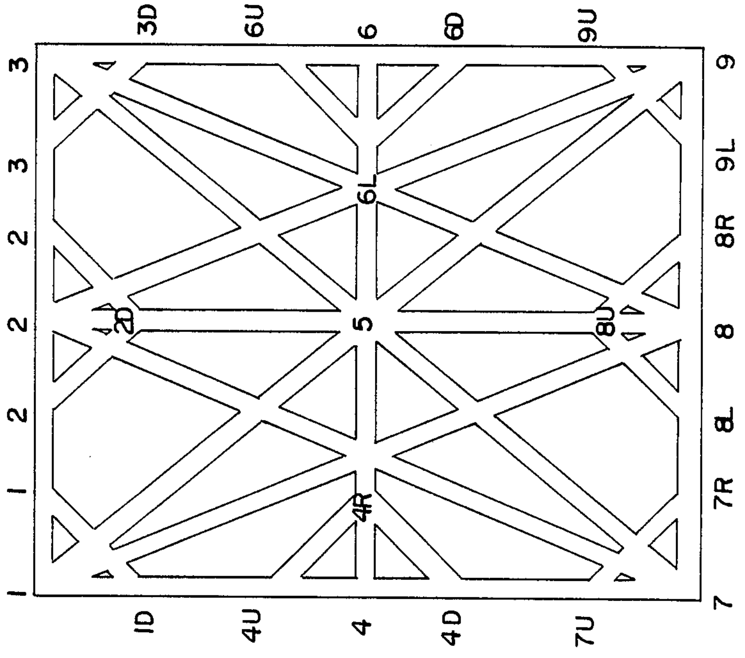
FIG. 12 is similar to FIG. 11 except that straight grooves are used to join the corner lines.

See FIG. 12

FIG. 12 is the same as FIG. 11 with the difference that the curvilinear grooves located on the corners are changed into straight line grooves.

The straight line grooves, like 1R-1D, allow the use of straight rotatable cylinders in the grooves, which was not possible with the curvilinear grooves on FIG. 11.

Figure 13:
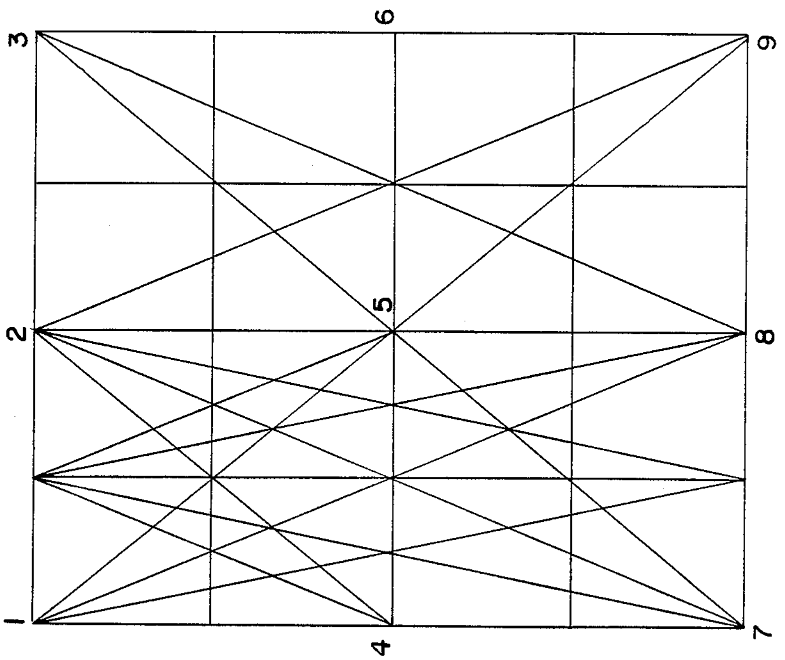
FIG. 13 shows a continuous groove joining the locations of the holding means shown in FIG. 5.

See FIG. 13

FIG. 13 is basically the same as FIG. 8 with mini figures, like No. 8, superimposed inside the major figure using the same principle described in FIG. 5.

Figure 14:
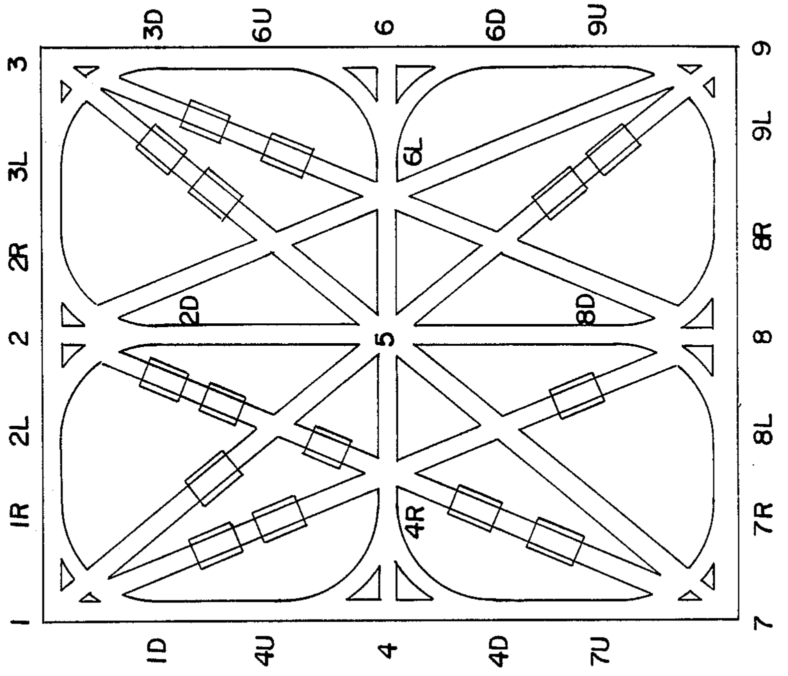
FIG. 14 shows a continuous raised track, guideway of the like joining the locations of the holding means shown in FIG. 4.

See FIG. 14

FIG. 14 is basically the same as described for FIGS. 8 to 13 except that the lines in FIG. 14 represent a continuous raised track in a similar way to a rail track, and with mini wagon-like units rolling along said track, and by positioning said units along the different sections of the track, any of the required symbols could be displayed.

In certain cases, the track consists of a simple metallic track with mini-wagon-like rollers moving along said track with either the track itself or the rollers being magnetized to keep them holding to each other.

Figure 15:
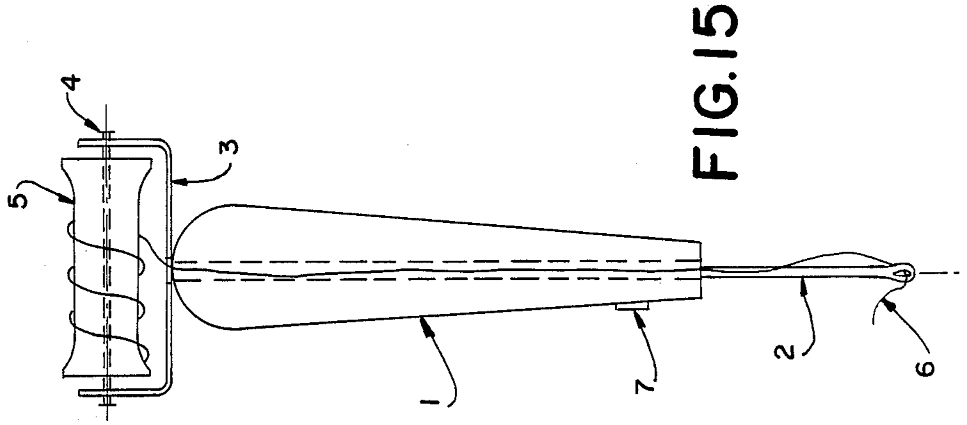
FIG. 15 shows a pen holder, holding a spool on one end and a needle with a thread at the opposite end.

See FIG. 15

FIG. 15 shows an assembly of a handle, like No. 1, with a spool, like No. 5, a tie attached to a self-threading needle used altogether as a pen to spread the tie No. 6 in between the different holding means, shown on FIGS. 1 to 6.

To show a certain symbol, the No. 2 is inserted in the horseshoe-shaped holding means to allow the tie No. 6 to hook behind the core of the horseshoe shape and by spreading the tie in between different sets of holding means, any symbol represented on the common symbol could be displayed on any of the FIGS. 1 to 5. The tie No. 6 is usually coloured in contrast with the surface on which it is spread. This fact allows the symbols displayed to be distinguished visually, as well as with a touching process.

Figure 16:
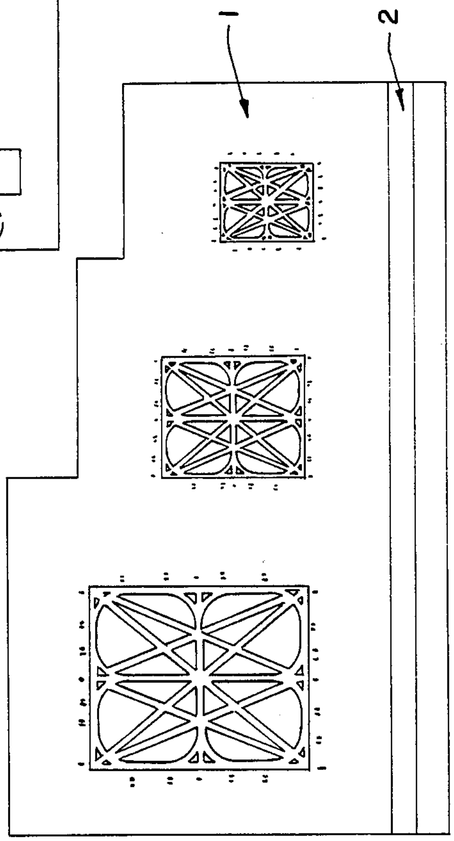
FIG. 16 shows a ruler on which are engraved different mini sizes of the patterns shown in FIGS. 8, 9, 10, 11.

See FIG. 16

FIG. 16 (referred hereinafter as the blind alphabet ruler) shows a mini common symbol of a group of symbols represented with a continuous groove on a solid ruler. This arrangement is used as a guide for a scriber instrument to mark any of the required symbols with a coloured ink generally by means of a 3 pin guided scriber. The first pin passing through the model groove, the second pin is guided by a separate straight groove while the third pin is marking on an outside surface the same line followed by the first pin in the model.

Figure 17:
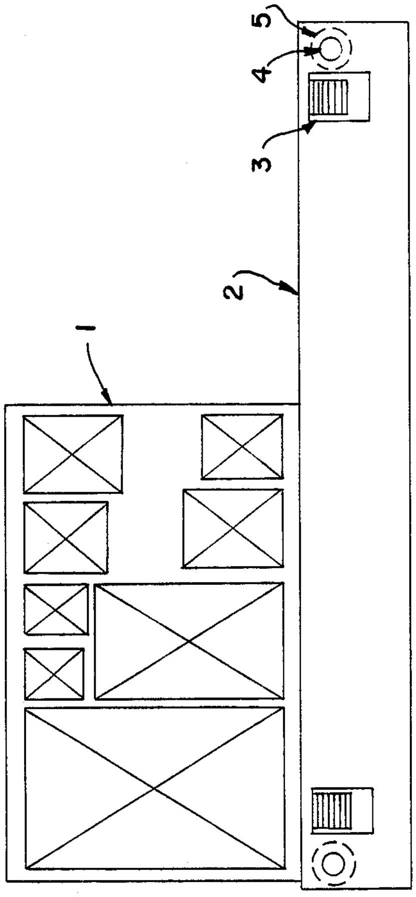
FIG. 17 shows a template with cut through engraving of different sizes of the patterns shown in FIGS. 8, 9, 10, 11. Said template is mounted on a rolling chassis with left and right sliding track.

See FIG. 17

Figure 17A:
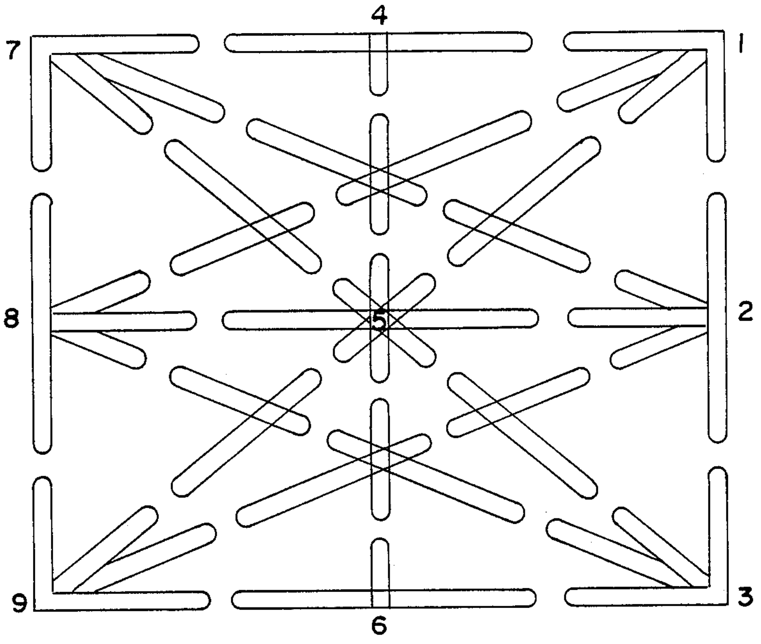
FIG. 17*a* shows the templates used in FIG. 17 with uncut spots to keep the pieces together.

FIG. 17 shows a set of templates, of different sizes, of the types shown in FIG. 17A mounted on a ruler provided with rollers, like No. 3, at both ends to allow it to roll up and down and with suction cups, like No. 5, to allow it to be fixed on the surface supporting it. At the same time, said ruler is provided with sliding track, like No. 2, to allow the templates, like No. 1, to be moved left and right on the supporting surface.

See FIG. 17A

FIG. 17A (referred to hereinafter as the blind alphabet template) is basically the same as FIGS. 8 to 13 with the difference that the groove is cut through leaving the parts separating the grooves detached from each other, except for certain spots like Nos. 10, 11, 12, etc. to keep the parts separating the grooves holding together with the same spacing all through. This arrangement results in a moulding template on which any of the symbols represented by the common symbol could be reproduced on this moulding template.

Figure 18A:
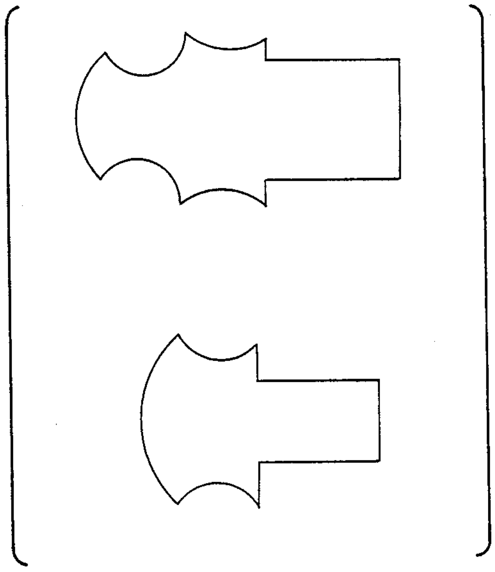
FIG. 18*a* shows typical multi-level raised holding means used in the symbols of FIGS. 5 and 18.
Figure 18:
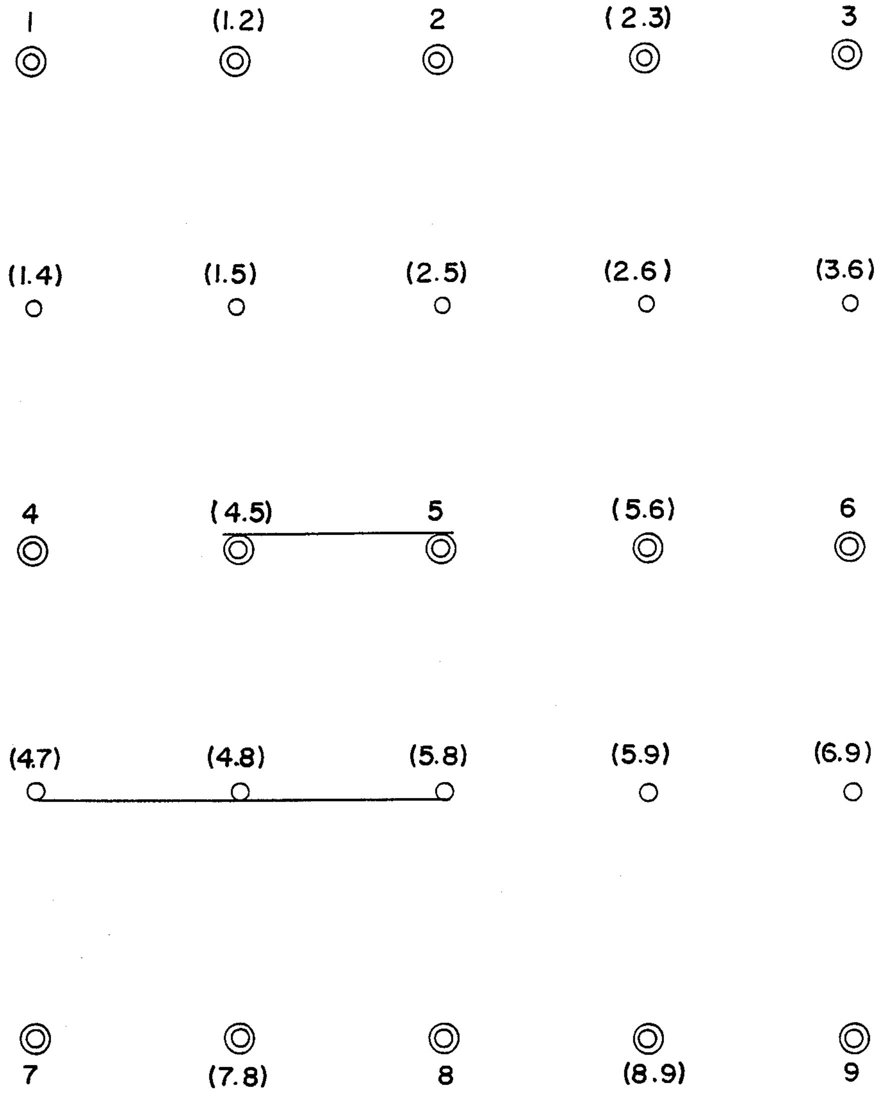
FIG. 18 shows the same pattern shown in FIG. 5 adapted for a permanent blind calendar.

See FIG. 18

FIG. 18 shows a similar pattern to that described in FIG. 5 used as a permanent blind alphabet calendar in the following manner:

(a) The outermost pattern is used to display the day of the week.

(b) The right and left halves of the pattern are used to display the date of the month.

(c) The upper 2 quarters of the pattern are used to display the name of the month.

(d) The lower 2 quarters of the pattern are used to display the current year.

See FIG. 18A

FIG. 18A shows the dowels, or holders, used as holding means in the permanent calendar shown on FIG. 18.

Figure 19:
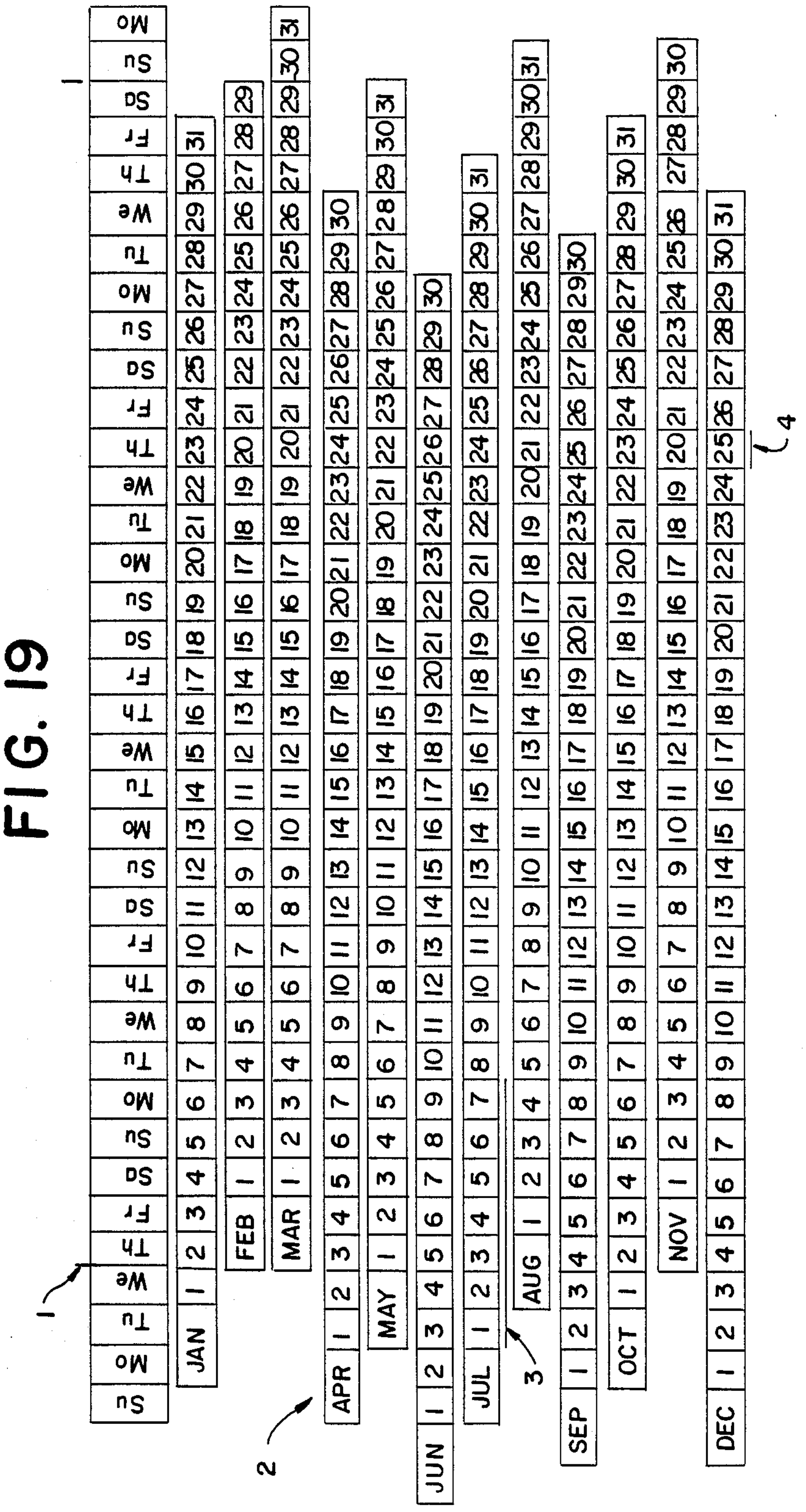
FIG. 19 shows a complete permanent blind calendar

See FIG. 19

FIG. 19 shows a complete permanent blind alphabet calendar consisting of a fixed row of 5 consecutive weeks plus 2 week days, like No. 1, with exact divisions dividing the 37 week days.

The top row, No. 1, is followed by 12 separate rows representing 12 months of the year divided with the same divisions used to divide the week days in No. 1. Each of the 12 separate rows represent 1 month with the exact number of days of that month printed, or engraved, on it.

Each row, representing 1 month, is set in its right place in the consecutive order as it occurs in the year.

To set the permanent calendar, the first division of the January row, for example, is slided under the first week to correspond with the division of the week day on which January begins, and the following months are set next in the same way. The result is a permanent calendar showing the whole days of the year with each month in its right place with regard to the week days. Each year, the 12 rows of months are reset in the same way as described above.

To underline the present week during the month, a T-shape solid piece, or the like, similar to No. 3, is inserted in between the rows under the row of the present month and under the present week to underline the current week.

A cursor (like No. 8, FIG. 20) sliding over the top row, No. 1, and extending down to the last of the 12 month rows to indicate the present day at the intersection of the cursor with the month row indicator, No. 3 (FIG. 19).

A miniature T-shape marker, or the like, see No. 4, is inserted in between the rows to underline the important days to be remembered.

Figure 20:
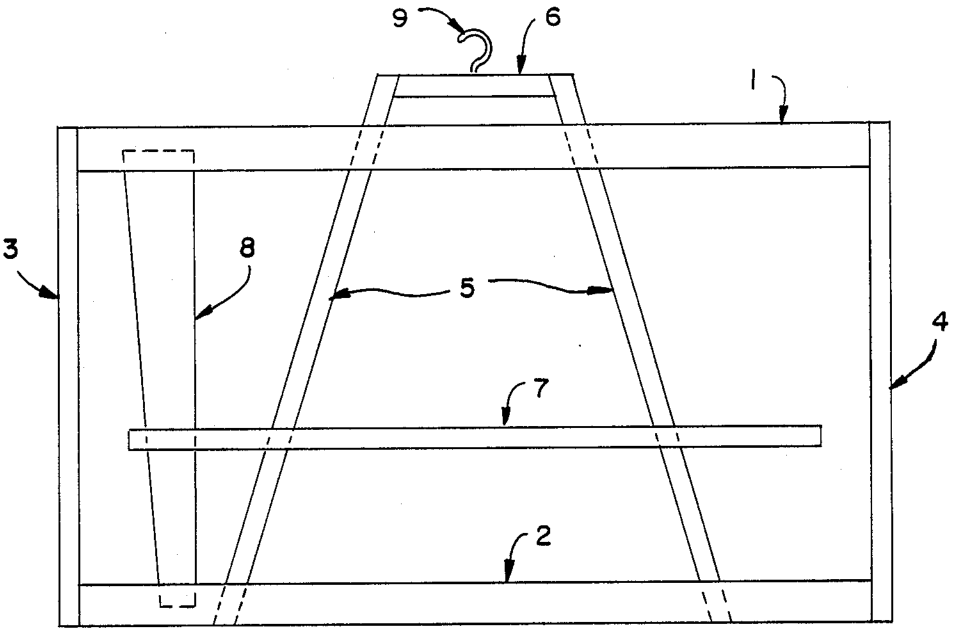
FIG. 20 shows a typical chassis for holding the permanent blind calendar shown in FIG. 19.

See FIG. 20

FIG. 20 shows a typical chassis on which a permanent calendar could be installed. Said chassis consists of a contour frame like 1, 2, 3, 4 with braces, like No. 5, and with hooking means, like No. 9. The 12 rows are positioned below the band No. 1 with a cursor, like No. 8, extended from the band, No. 1, over the 12 month rows stacked below.

Figure 21:
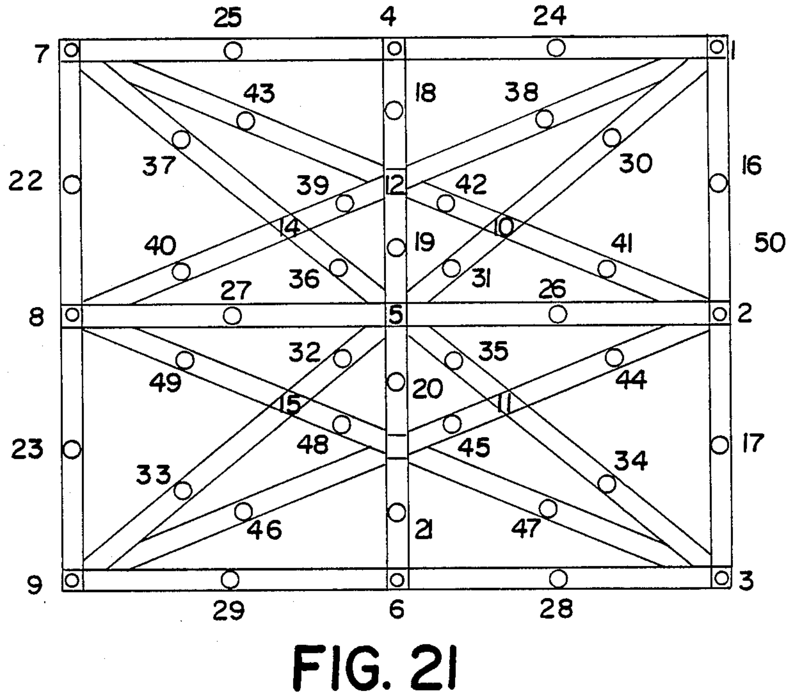

See FIG. 21

FIG. 21 has basically the same pattern as FIG. 8 to 13, except that it uses mobile solid bars, inking elements, lighting, burning, magnetic elements or the like, in between the locations of the holding means. Said solid bars or elements are made in separate sections that are connected separately in various combinations to different command centers, and by activating one or more of these command centers, the corresponding set of bars or elements are activated to print, light, burn, display or induce the required symbol or letter.

Figure 22:
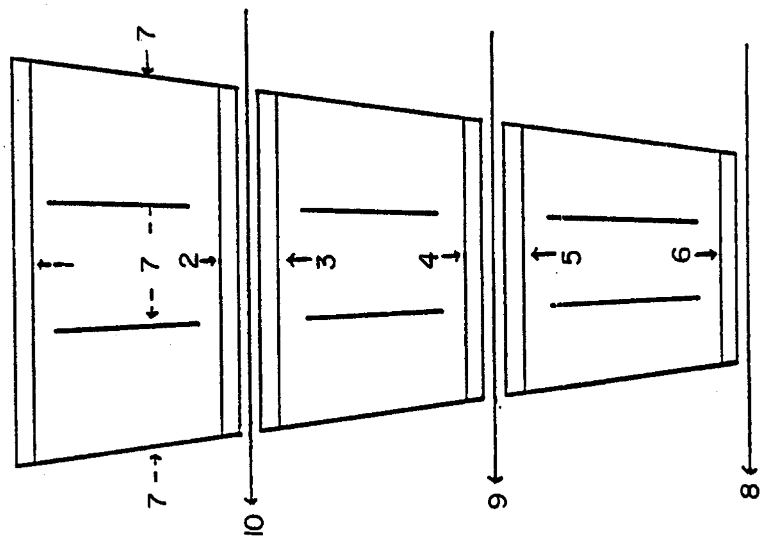
FIG. 22 shows a plurality of different size patterns similar to that shown in FIG. 21 with plurality of printing sheets for different size characters.

See FIG. 22

A dual superimposed reversed variable size sets of common symbols like Nos. 1, 2, 3, 4, 5, 6, similar to that described in the above paragraph are used, with transversal pins like No. 7, separating the said bars or elements, and in certain cases, communicating the action in between them to print or produce different size symbols on different sheets like Nos. 8, 9, at different levels in between the pairs of the superimposed common symbols.

Figure 23:
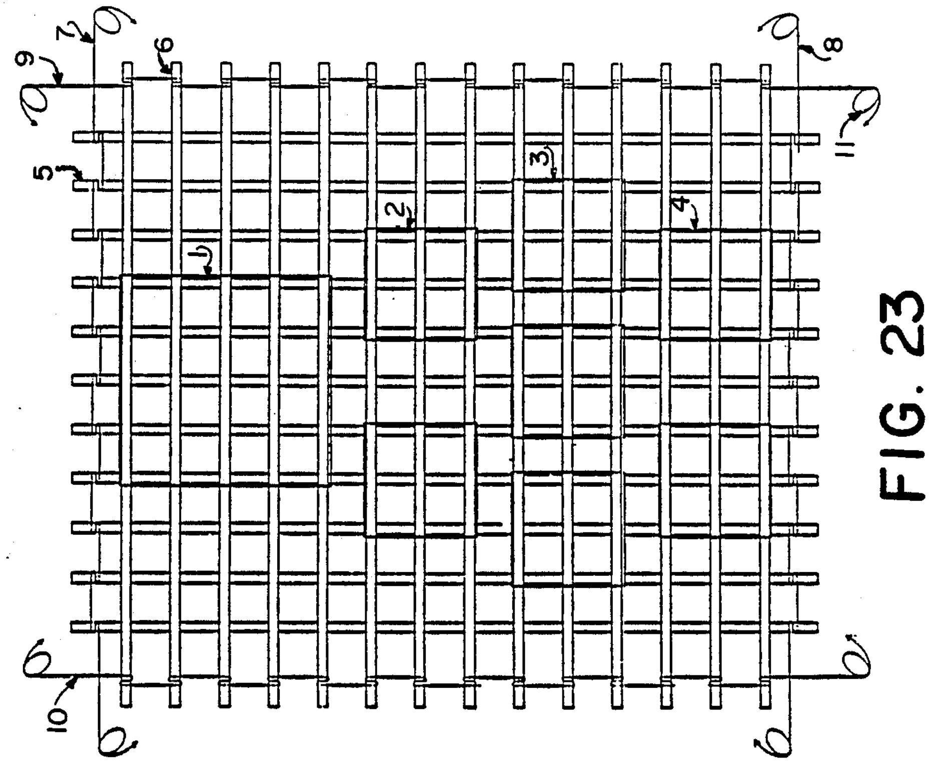
FIG. 23 shows a frame of a common alpha-numeric symbol with mobile holding means to allow for the reduction or enlargement of the displayed symbols.

See FIG. 23

FIG. 23 shows a set of superimposed common symbols similar to those shown in FIG. 5 and described in Chapter 7-5, with the difference that FIG. 23 shows a frame or mobile holding means consisting of 5 horizontal equidistant bars like No. 6 and another 5 superimposed equidistant cross bars like No. 5 perpendicular to the first ones, creating at their intersections 25 mobile free holding points.

The horizontal bars are supported at their opposite ends by elastic ties, like No. 9, 10 and the vertical bars are equally supported at their opposite ends by similar elastic ties like No. 7, 8.

The elastic ties No. 7, 8, 9, 10 are rolled individually around pulleys like No. 11 and converge all together to a common point under a single command.

By pulling the elastic ties 7, 8, 9, 10 at their central command, or by releasing them, the cross bars No. 5, 6 get apart or closer to each other, bringing their intersection points equally apart or closer.

At the same time, any symbol, letter or figure displayed by means of colored elastic ties, interwoven in between the holding means created at the bar crossing, stretches into a larger symbol when the crossing points get apart and shrinks into a smaller symbol or letter when the crossing points get closer.

The result is: a frame of 25 mobile holding cross points, good for a minimum of 252 different alpha numeric characters, shown in a set of 7 units each display, double variable:

First, by interchanging one character for another on the same frame.

Second, by enlarging or reducing the size of the 7 displayed characters by single command of the elastic ties No. 7, 8, 9, 10 supporting the cross bars No. 5, 6, that offer at their cross points the holding means to the displayed symbols.

Figure 24:
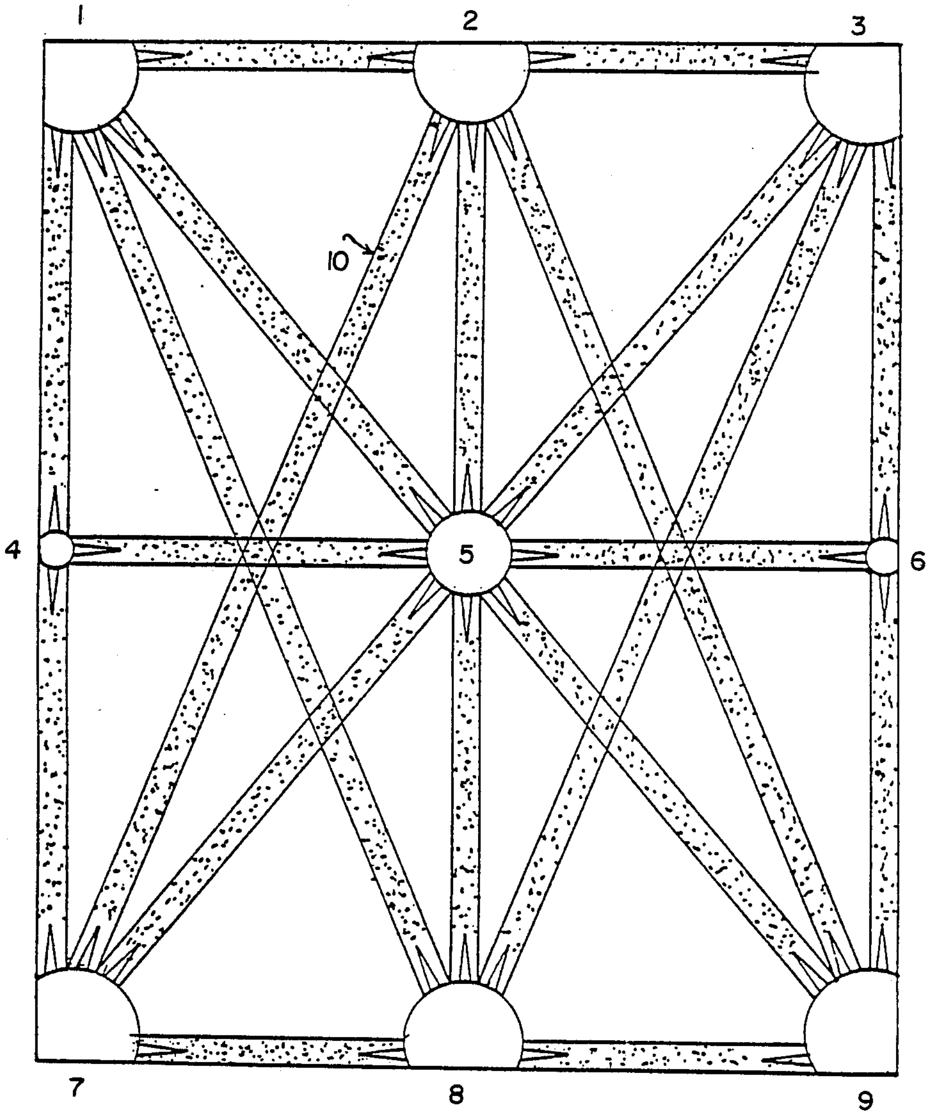

See FIG. 24

FIG. 24 shows an alpha-numeric common symbol with flashing light sources, like No. 1 to 9, located at the intersections of the main lines of the common symbol and beaming along the lines of the said common symbol over strips, like No. 10, covered with mini-reflectors to accentuate the light lines displaying the required letters on the common symbol.

In certain cases, reflectors are used in place of the light sources, which reflectors reflect the lights directed to them from an adjacent light source and redirect said lights to another strip along the lines of the common symbol.

Figure 25:
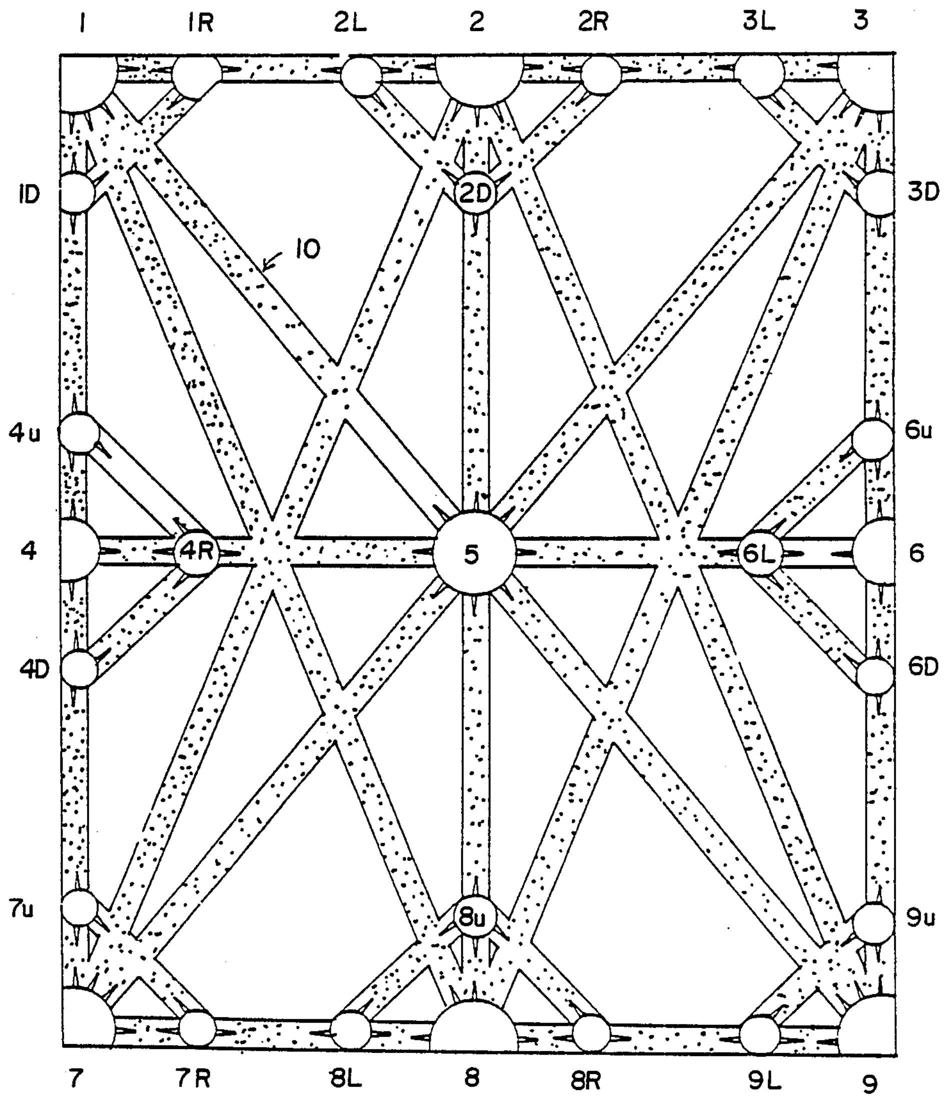
FIG. 25 is the same as FIG. 24 with additional light sources in between the original ones.

See FIG. 25

FIG. 25 shows an alpha-numeric common symbol similar to that shown on FIG. 24 with additional light sources, like No. 1R to 9L, located at intermediate points in between the main light sources, 1 to 9, to allow the display of capital and non-capital alpha-numeric characters and with more details than it would be possible with the light sources on FIG. 24.

Figure 26:
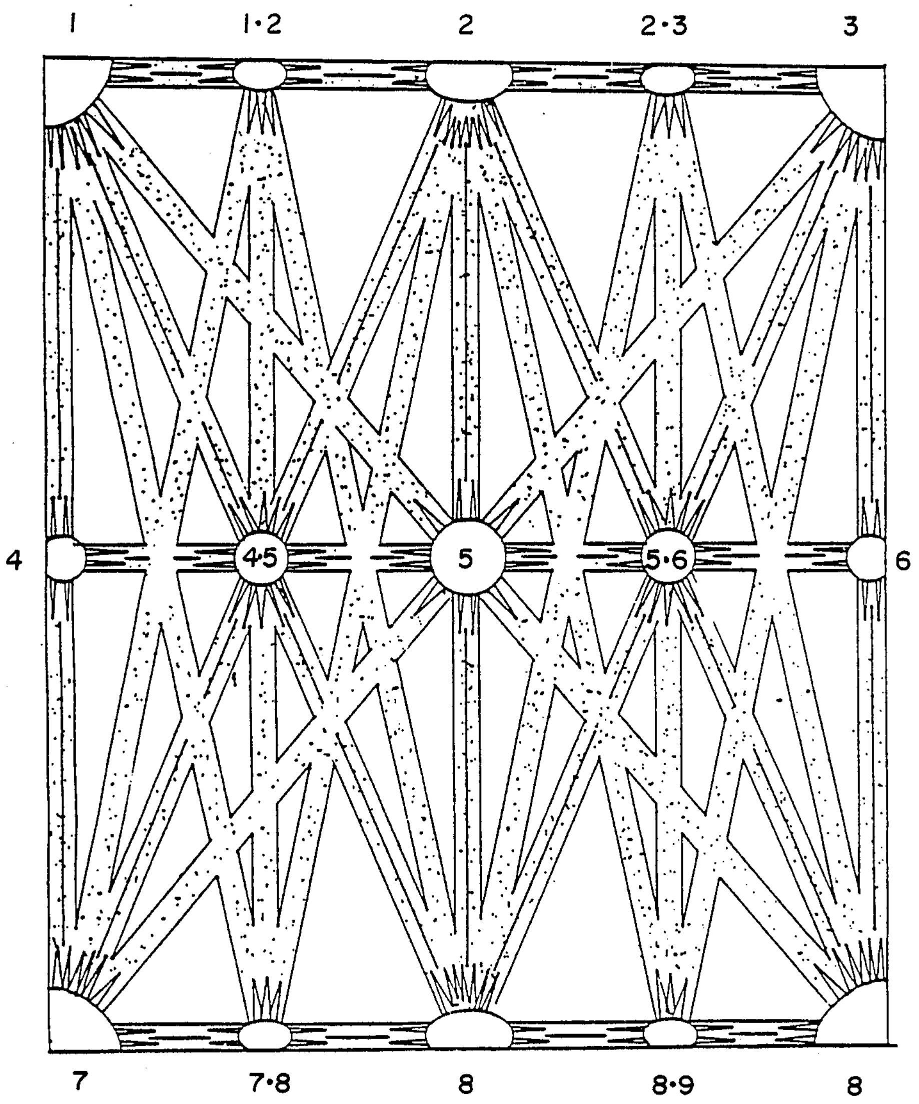
FIG. 26 is the same as in FIG. 24 with multi-colored light sources and with additional light sources in between, producing combined super-imposed symbols.

See FIG. 26

FIG. 26 shows basically the same picture shown on FIG. 24, but with double light sources at the main points 1 to 9 and with additional similar light sources, like No. 1.2, 4.5, 7.8, forming, with the light sources 1, 2, 4, 5, 7, 8, a superimposed common symbol at the left half of the original symbol marked from 1 to 9.

Similarly the addition of the light sources, No. 2.3, 5.6, 8,9, combined with the original double light sources at points 2, 3, 5, 6, 8, 9 produce a complete superimposed common symbol at the right half of the original symbol marked by points 1 to 9.

The light sources at the main points 1 to 9 are made double.

At the same time, said light sources are passed through different coloured media to produce different coloured beams, projecting different coloured lines along the lines of the common symbols.

Said coloured lines are separated with opaque plates, like No. 11, to differentiate the different, displayed superimposed symbols where each one of which is displayed in a different colour at the same time.

This procedure allows the display of different superimposed symbols, at the same time, identified by their different colours.

This type of display could be programmed to produce a continuous chain of messages using series of common symbols arranged in lines where different words and sentences could be flashed on the same common symbols continuously one after the other.

Figure 27:
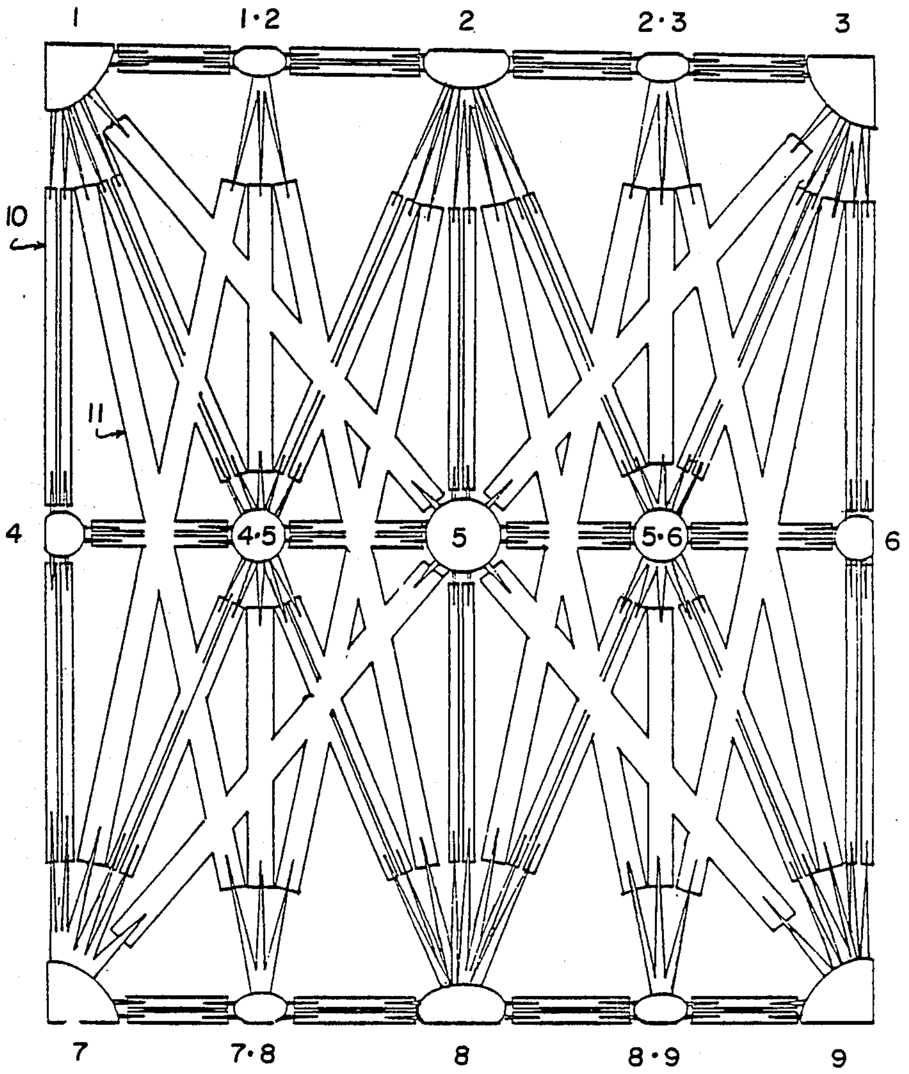
FIG. 27 is the same as in FIG. 26 with additional colored transparent tubes used as conduits for the beaming lights.

See FIG. 27

FIG. 27 shows the same picture shown on FIG. 26 with the difference that the lights are beaming through transparent tubes along the lines of the common symbol.

In certain cases, the projecting lights pass through coloured media before passing through clear transparent tubes to produce inside said tubes coloured light beams that could be, for example, blue lights, flashing from left to right or red light beams flashing from right to left, and in other cases, white light beams could be flashing through coloured, transparent tubes producing the same colour display from either direction.

Figure 28:
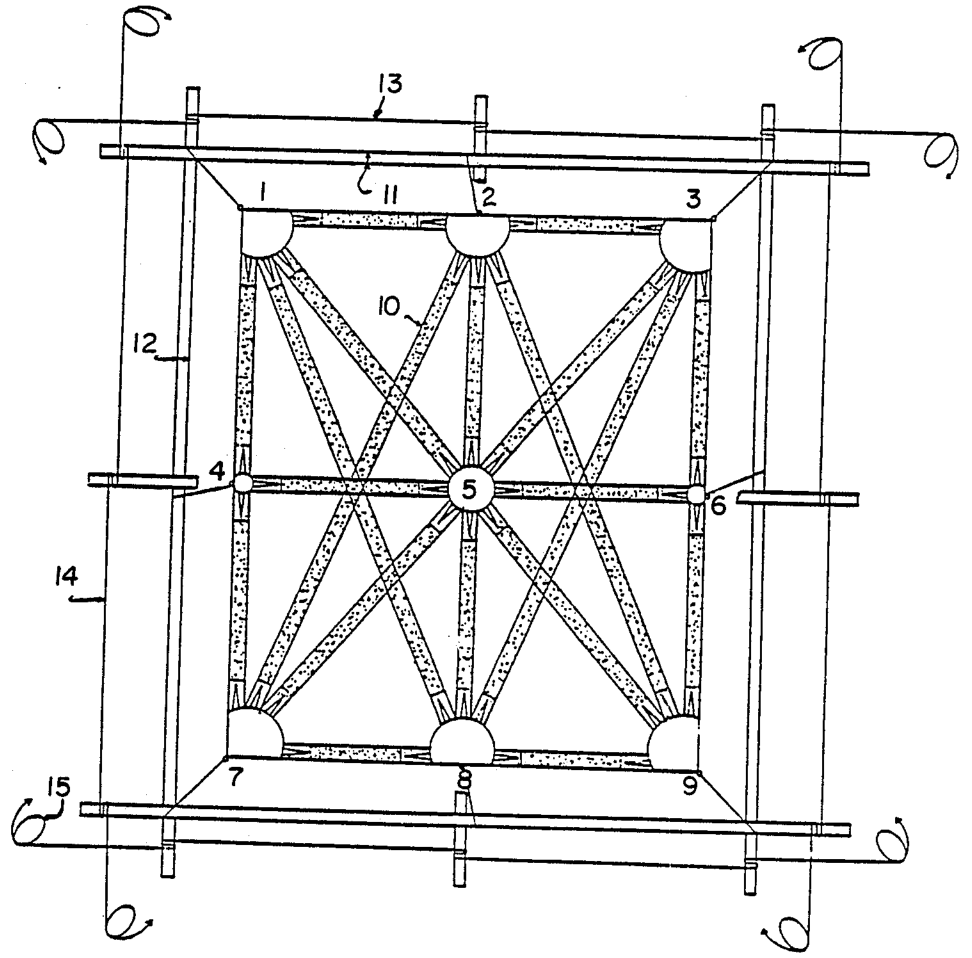
FIG. 28 is the same as in FIG. 24 with means to enlarge or reduce the displayed symbols (see FIG. 23).

See FIG. 28

FIG. 28 shows a combination picture of FIG. 24 superimposed over the grid shown on FIG. 23.

The light sources No. 1 to 9 are connected to the intersection of the grid of bars No. 11, 12 and in turn said bars are held by elastic ties like No. 13, 14 that are rolled around conversion points, or pulleys, like No. 15, and continuing towards a common point where they could be pulled in or released with one simple command so pulling the grid of bars, No. 11, 12, far apart, pulling with them the light sources at No. 1 to 9, far apart to produce larger displayed symbols, or vice versa.

The strips, No. 10, along the lines of the common symbol are superimposed with each section attached to the opposite side of the other, so allowing the whole symbol to grow larger or to get smaller following the pulling or the releasing of the elastic ties, No. 13, 14.

Figure 29:
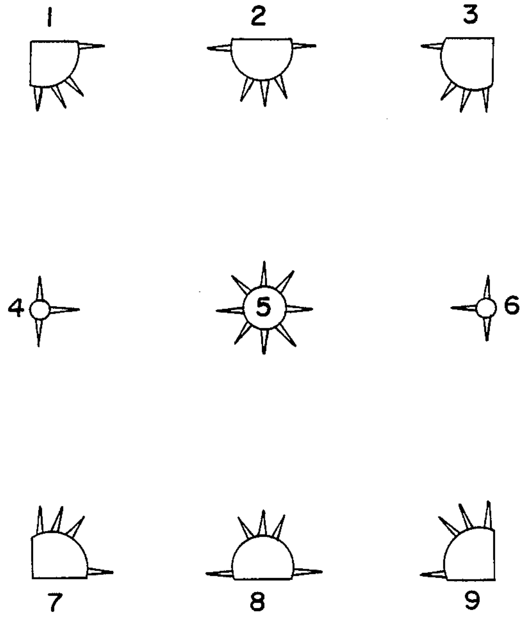
FIG. 29 is similar to FIG. 24; (a) with vibrating lights beaming in the space without backing strips behind ; them; (b) with fixed or rotary central lights projecting their lights on peripherical reflectors to display the required letter or symbol.

See FIG. 29

FIG. 29 shows similar light sources positioned as those on FIG. 24 with the difference that these light sources on FIG. 29 are beaming through the space along the tracks of the common symbol without the backing strips shown on FIG. 24.

In certain cases, said lights give vibrating intermittent flashes to accentuate the display of the required symbols.

This method could be used for space display, for fire-work display, etc.

At the same time, at certain intermediate points where light sources could not be installed they could be replaced with reflectors to divert the beaming lights from adjacent light sources into other directions.

In certain cases, central lights are installed at the center of the common symbols, described in FIG. 24 or 29, beaming their lights to reflectors located on the periphery of the common symbol which reflectors redirect said lights along the lines of the characters to be displayed.

At the same time, a reduced number of rotative central lights could be used and programmed to rotate towards selected reflectors to display the required letter or figure. The embodiment of the invention in which an exclusive property and privileges are defined as follows:

I claim:

1. A guided writing system and a variable display variable assembly, for signs, illustrations, and displays or the like, comprising mobile guiding points located at the main intersections of the lines of a common symbol, representing a group of symbols, characters, letters, figures, codes, signs or the like, and mobile multi-directional displaying means along the lines of the individual symbols or characters to be displayed.

2. A guided writing system and a variable display assembly, as in claim 1, wherein said guiding points consist of holding means and said displaying means consist of tying means, using a common symbol representing the alphabet and the arabic numbers or the like with at least 6 holding means for the arabic numbers or at least 9 holding means for the alphabet at the main intersections of the lines of said common symbol, and with tying means joining a selective number of said holding means to display a required letter or figure.

3. A guided writing system and a variable display assembly, as in claim 2, duplicating at least 9 holding means in the left half of the assembly, the right half, the upper left quarter, the upper right quarter, the lower left quarter and the lower right quarter equally where the different tying means joining the sets of holding means in each secondary assembly are of different shape or color, where said additional holding means are combined when superimposed.

4. A guided writing system and variable display assembly, as in claim 2, using indentations, holes or the like in a flat surface, papers, cardboards, plastic sheets, wire mesh or the like, to hold tie lines spread in between selective numbers of indentations to display a required symbol, where in certain cases, said indentations are reduced to simple cuts in the flat surface with part of the cuts sections protruding above the flat surface to allow the hooking of tie lines, and for indentations located at the center of the common symbol, a plurality of indentations are made to accommodate the tie lines coming from different directions, said tie lines are, in certain cases, held through the configuration of the indentation itself, like horseshoe configuration, or the like, and in other cases, said tie lines are provided with hooks, pins, sticking means, or the like, that hold said ties at the required spot.

5. A guided writing system and a variable display assembly, as in claim 4, using a handle supporting a spool at one end and a needle at the other end with a tie unrolling from the spool and passing through the needle which serves to pass the tie through the surface, to be hooked, behind the indentation provided in said surface, with a cutting device attached to said holder used to cut said tie when necessary.

6. A guided writing system and a variable display assembly, as in claim 1, using, in between the guiding points, continuous grooves, raised tracks, magnetic strips, strings, etc, in a pattern following the lines of a common symbol on which anyone of a group of symbols, signs, characters, letters, or numbers, represented on the said common symbol could be displayed individually, with removable, identifiable fillers, or coverings along the lines representing the letter or symbol to be displayed.

7. A guided writing system and a variable display assembly, as in claim 6, using a common symbol representing the alpha-numeric characters where any character of the alpha-numeric characters could be displayed individually, in a pattern consisting at least of the following lines; (a) along 3 horizontal lines, boarded at their opposite ends with 2 vertical lines and intersected at their middle points with a vertical central line; (b) along 2 diagonal lines joining the 4 corners of the so described pattern; (c) along 2 diagonal lines joining the corners of the left half of the so described pattern; (d) along 2 lines joining the corners of the right half of the so described pattern or the like with removable, identifiable fillers, or coverings, along the lines representing the character to be displayed.

8. A guided writing system and a variable display assembly, as in claim 7, used for large patterns using multi mini patterns the same as the pattern described in FIGS. 8 to 12 duplicated inside the main major pattern, at the left half of the major pattern, the right half, the top left quarter, the top right quarter, the bottom left and right quarters equally.

9. A guided writing system and a variable display assembly, as in claim 6, using; (a) rectangular grooves filled, along the lines of the symbol to be displayed, with flexible ties, cords, rubber ties, flexible hoses, paste or the like and in the case of shallow grooves, said grooves are filled with formaline drafting tape or even simply marked with a marker along the lines of the character to be displayed, with a filler always in a color in contrast with the color of the surface on which it is displayed, while in the case where flexible thick rubber tape is used, the symbols displayed could be soaked with ink, or the like, and used as a stamp to duplicate said symbols; (b) rectangular groove totally filled with pulverized removable substance where said substance is scraped out along the lines of the character to be displayed; (c) substantially semi circular grooves totally filled with bi-color tubular sections, which sections are rotated in place to show the same color along the lines of the character to be displayed; (d) substantially semi circular grooves filled with crystals, beads, rollers or the like along the lines of the character to be displayed and to change said character, said crystals are rolled through the grooves to occupy the lines of the new character to be displayed; (e) light colorless marking that could be used as a guide line to trace the selected letters or figures.

10. A guided writing system and a variable printing and display assembly, as in claim 1, using, in between the guiding points, separate bars, inking elements, lighting, burning elements, or the like, along the lines of a common symbol representing the alpha- 0 numeric individual characters, or the like, in a pattern consisting at least of the following lines; (a) along 3 horizontal lines, boarded at their opposite ends with 2 vertical lines and intersected at their middle points with a vertical central line; (b) along 2 diagonal lines joining the 4 corners of the so described pattern; (c) along 2 diagonal lines joining the corners of the left half of the so described pattern; (d) along 2 diagonal lines joining the corners of the right half of the so described pattern, or the like, where said bars or elements are connected in various combinations to different command centers, and by activating one command center, the corresponding letter, figure, or the like, could be displayed on the common symbol, or printed on a certain surface.

11. A guided writing system and a variable printing and display assembly as in claim 10, using a plurality of different size superimposed units similar to that described in claim 10 with connectors used also as separators in between, used in certain cases to transfer the action from one unit to the other, such arrangement uses double reversed common symbol units at each level, the upper unit connected to the unit above it and the lower unit connected to the unit below, with printing paper passing in between each pair of adjacent common symbol units, and to print or display any character represented on the common symbol units, the command center corresponding to that character and to the proper size of that character is activated and the corresponding character is displayed or printed at the selected level on the paper passing in between the selected pair of adjacent common symbol units.

12. A guided writing system and a variable display assembly, as in claim 6, using templates containing different size common symbols which templates are used to mark any symbol or letter, represented on the said common symbols on an outside surface with the help of a multi pin soriber passing through the grooves of the required symbols and marking with a separate marker outside the templates, the same pattern followed on the engraved model, and in certain cases, especially for larger size characters, the grooves are cut all through the templates, leaving certain spots uncut to keep the pieces of the common symbol together where in such case any of the said characters could be directly marked on a surface underneath the template by passing a simple pin through the grooves of the common symbol, along the lines of the character to be marked, where in addition to that, large templates are mounted on separate tracks on which they could be slided laterally, which tracks, in turn, are fastened on rollers allowing them to be rolled up and down and with flexible suction cups mounted on the said tracks allowing them to be fastened on the surface on which they are used, and moreover for simple current writing guides the common symbols are embossed on writing papers, envelopes, cardboards or the like and simple pins are used to mark the required characters by passing the pin through the grooves of the common symbols along the lines of the characters to be marked whether for letterheads, addresses on envelopes, name plates, menues, price lists or the like.

13. A guided writing system and a variable display assembly, as in claim 3, used as a perpetual calendar using generally the outermost pattern for representing the days of the week, the left and right half for representing the date or the month, the upper left and right quarters for representing the name of the month and the two lower left and right quarters for representing the last two digits of the current year or the like, which representation is made by means of different colored flexible ties interwoven in between the holding means along the lines of the letter or figure to be displayed, which symbols could be changed when needed by undoing the said ties and rerouting them in between other sets of holding means to display new letters and figures, and to show seperately the complete gregorian calendar year, a row of 5 weeks and 2 additional week days, are displayed consecutively along generally, a horizontal line, with exact divisions in between the week days, under which 12 rows for the 12 months of the year are stacked over each other in their right sequence, each of which is marked, at one end, with the name of the month it represents and with its exact number of days separated by the same distances separating the week days shown at the top row of the 37 week days already described, where each year, the said 12 rows are moved and repositioned so that the first day of the month is aligned underneath the correct day of the first week of the top row on which it begins, resulting in a perpetual calendar, showing the whole year where each month is positioned and aligned to start in its right place under the correct day of the week, with a cursor sliding above the top row and extending down to the row of the last month, which cursor is provided with a central longitudinal window through which it shows the current day and with a marker sliding along its arm to show the current month, where the joint calendars are generally mounted on a decorative symbol, maple leaf, etc.

14. A guided writing system and a variable display assembly, as in claim 2, using rows of alpha-numeric common variable symbols displayed by elastic ties distributed on mobile holding means consisting of cross elements, bars, spring wires, or the like, fastened at their opposite ends; (a) in certain cases, through loops made on flexible strings stretched and held at outer fixed points, allowing the cross bars the possibility to move through their loops along the holding strings so spreading the cross points, which are the holding means, pulled apart, resulting in the enlargement of the variable symbols themselves; (b) in other cases, the holding strings are of elastic material, and to spread the cross bars apart, it would be enough to pull the carrying elastic strings at their ends, which fact spreads the cross bars far apart and enlarges the size of the variable symbols; (c) in further cases, the cross bars are fastened at their opposite ends to chains of springs, and by stretching the opposite ends of said springs, the cross bars are pulled apart and vice versa, again varying the sizes of the alpha-numeric symbols; (d) in further more cases, the cross bars are connected at each alternative intersection of zig-zag structures and by opening said zig-zag structures, or closing them, the cross bars are spread apart or brought closer, resulting in changing the distances between the said cross bars, and consequently, varying the sizes of the variable symbols resulting in a double variable alpha-numeric common symbols.

15. A guided writing system and a variable display assembly, as in claim 2, using flexible ties made of electric wires, provided with series of lights spread along the lines of the common symbol, said lines are connected in various combinations to different command centers and to display any individual symbol, the corresponding command center is activated to light the lights along the lines of the required symbol.

16. A guided writing system and a variable display assembly, as in claim 1, using at the intersections of the main lines of an alpha-numeric common symbol; (a) a plurality of light sources oriented in different directions and displaying lines of light generated by the projections of beaming lights oriented along the lines of the symbols or characters to be displayed, (b) multi-directional mobile light sources displaying lines of light generated by the projections of beaming lights along the lines of the symbols or characters to be displayed, (c) plurality of intermittent vibrating light sources projecting intermittent, vibrating lines of light along the lines of the symbols or characters to be displayed.

17. A guided writing system and a variable display assembly, as in claim 16, using combined, superimposed, common symbols, having plurality of lighting sources projecting in different directions, where said lighting sources; (a) pass through different coloured medias producing different coloured lights beaming in different directions with opaque plates, separating the different coloured beams of light to differentiate the different superimposed letters or figures displayed at the same moment, within a certain common symbol, (b) pas through coloured or transparent tubes used as light beam conduits in between the different guiding points.

18. A guided writing system and a varible display assembly, as in claim 16, using, (a) a plurality of central lights to flash, light beams on reflectors mounted on the periphery of the unit, at the main intersections of the lines of the common symbol to reflect their lights along the lines of the letter or figure to be displayed, (b) a reduced number of rotative central lights programmed to be oriented to the selected reflectors to display the required letter or figure.

19. A guided writing system and a variable display assembly, as in claim 16, using guiding points mounted on mobile supports and by approaching the said supports to each other or by putting them further apart, the displayed symbol would be enlarged or reduced.

* * * * *

UNITED STATES PATENT AND TRADEMARK OFFICE

CERTIFICATE OF CORRECTION

PATENT NO. : 4,838,792

DATED : Jun. 13, 1989

INVENTOR(S) : Ralph H. Hoyeck

It is certified that error appears in the above-identified patent and that said Letters Patent is hereby corrected as shown below:

Claim 1, line 2; delete "variable".

Claim 1, line 3: "mobile" should read --variable--.

Claim 1, line 6; "mobile" should read --variable--.

Signed and Sealed this

Twenty-sixth Day of June, 1990

*Attest:*

HARRY F. MANBECK, JR.

*Attesting Officer*

*Commissioner of Patents and Trademarks*